Jan. 19, 1926.  1,570,318
E. T. POLLARD
STONE CUTTING MACHINE
Filed April 30, 1924  4 Sheets-Sheet 1

Inventor:
Edson T. Pollard,
By Calvert Waters,
Attorneys.

Jan. 19, 1926.  1,570,318
E. T. POLLARD
STONE CUTTING MACHINE
Filed April 30, 1924   4 Sheets-Sheet 4

Inventor:
Edson T. Pollard,
By Robert V. Tatur,
Attorneys

Patented Jan. 19, 1926.

1,570,318

UNITED STATES PATENT OFFICE.

EDSON T. POLLARD, OF NIAGARA FALLS, NEW YORK.

STONE-CUTTING MACHINE.

Application filed April 30, 1924. Serial No. 710,082.

*To all whom it may concern:*

Be it known that I, EDSON T. POLLARD, a citizen of the United States, residing at Niagara Falls, in the county of Niagara and State of New York, have invented or discovered certain new and useful Improvements in Stone-Cutting Machines, of which the following is a specification, reference being had therein to the accompanying drawings.

This invention relates to stone cutting machines of that class in which cutting wheels are employed, and the invention has for its principal object to provide an improved mounting for the arbor or shaft which carries the cutting wheels and which mounting is of such construction that said shaft may be readily mounted and may be readily dismounted when it is necessary to change the cutting wheels or to adjust them to different positions longitudinally of the arbor or shaft, for making differently spaced cuts in the work, or to replace said arbor or shaft by another. The invention also comprises some other features of improvement in machines of the class referred to, all as will hereinafter fully appear.

Figure 1:
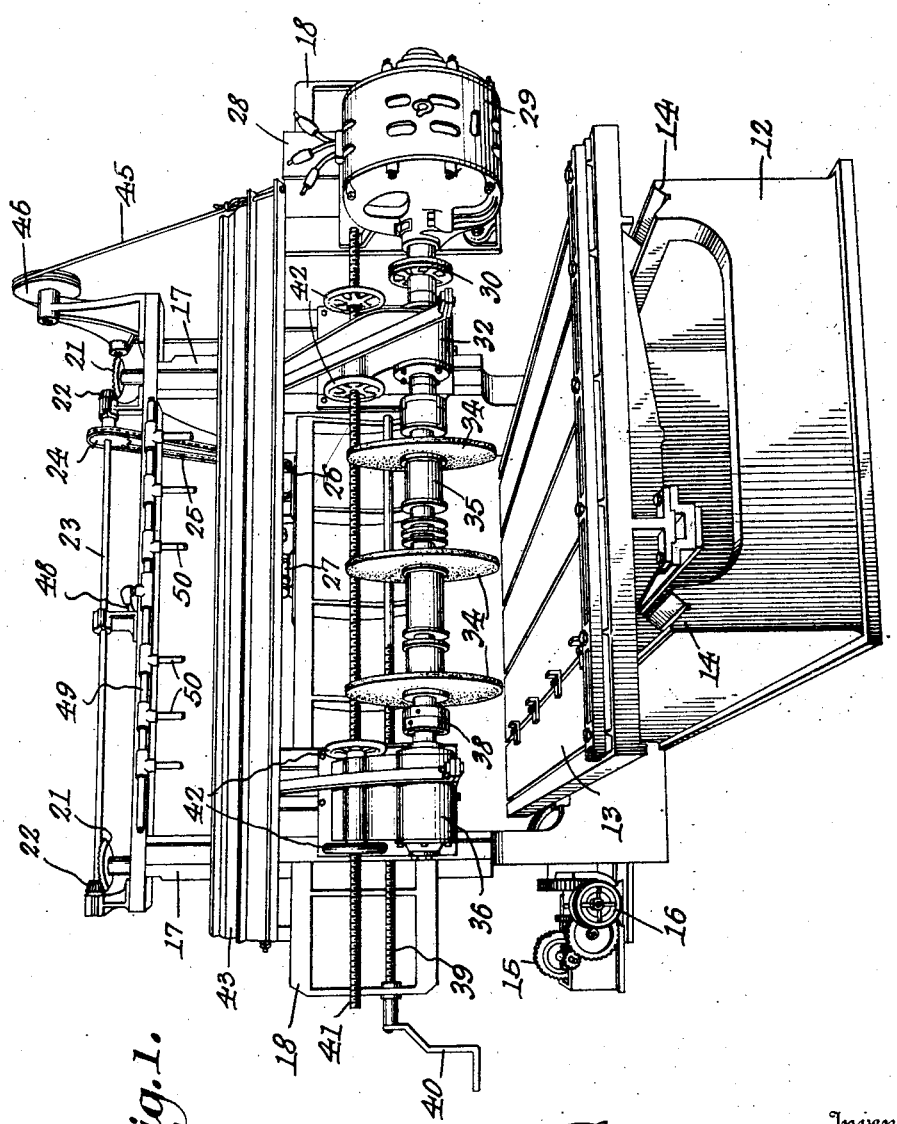
Figure 2:
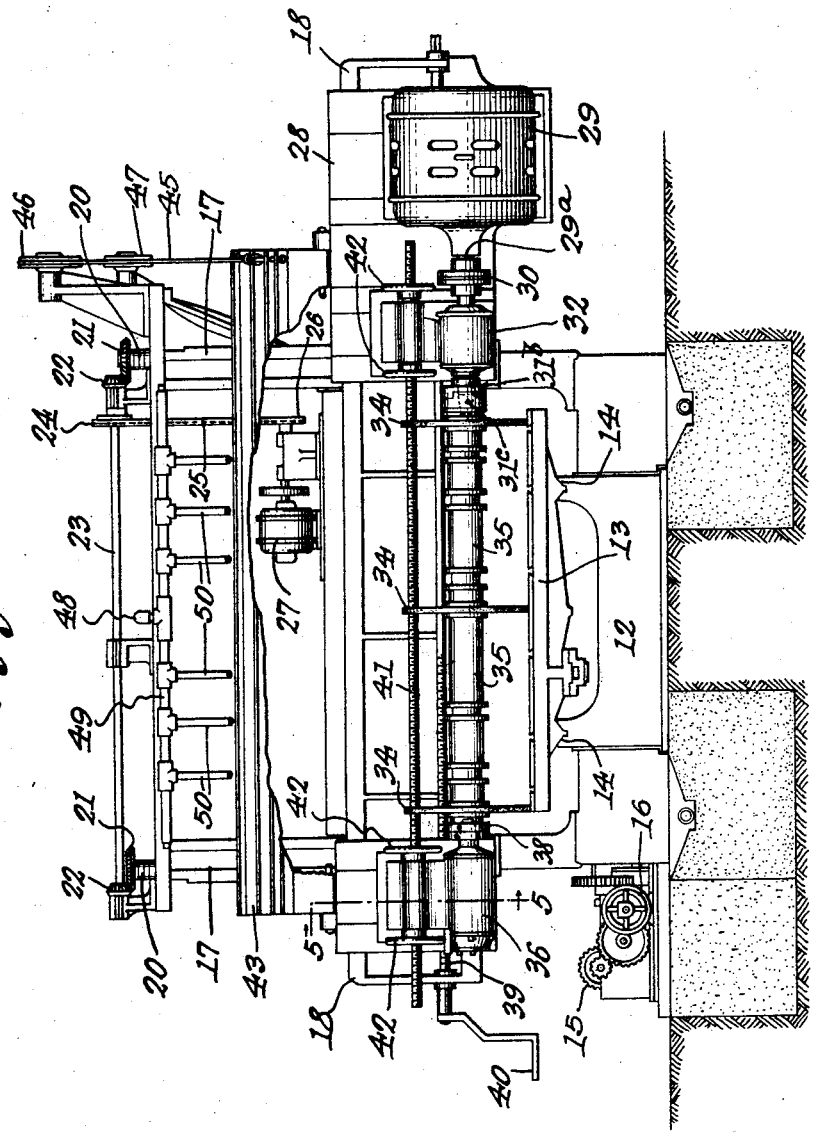
Figure 3:
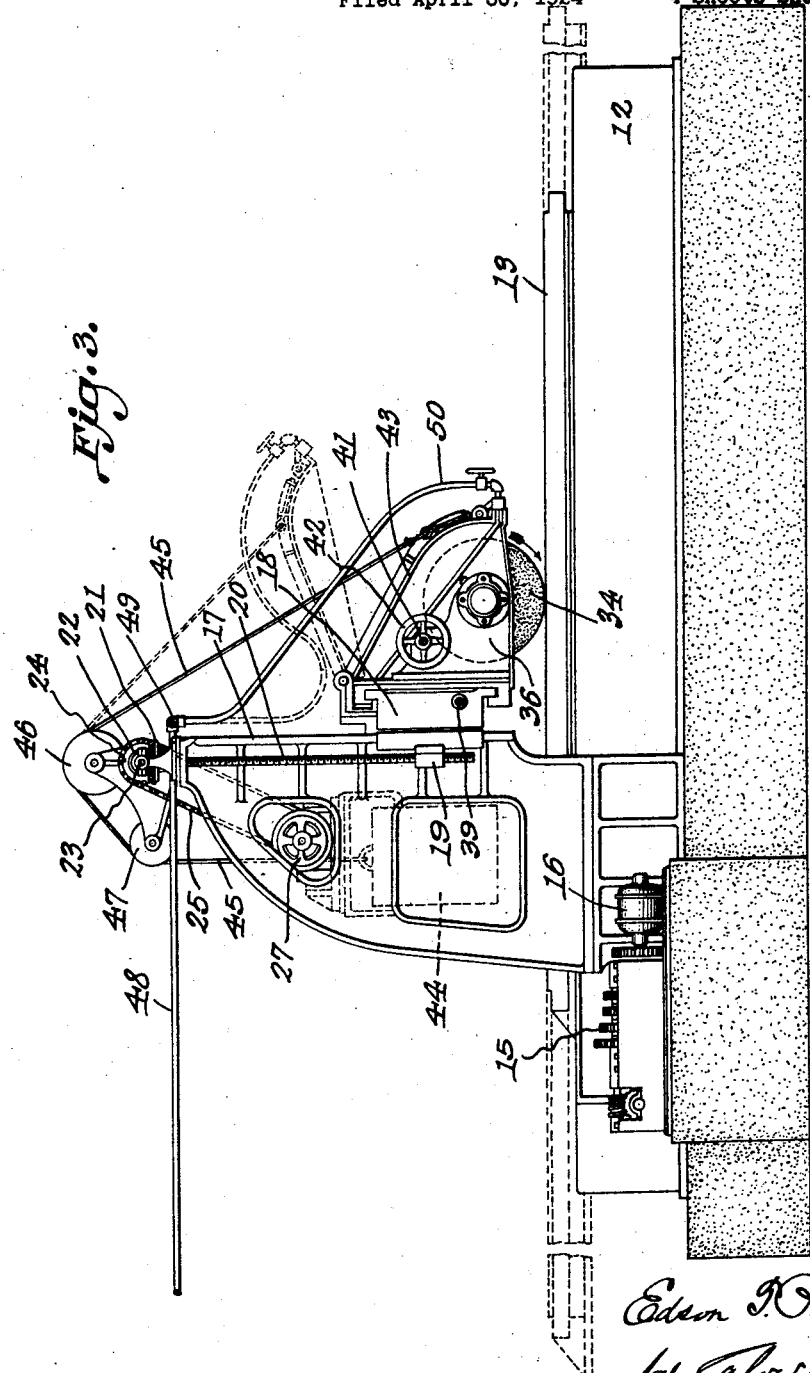
Figure 4:
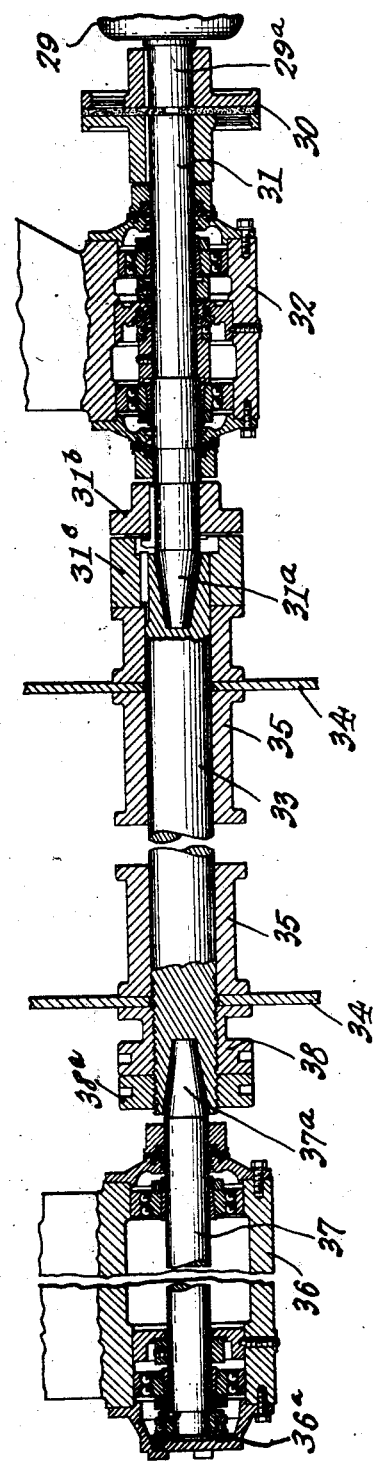
Figure 5:
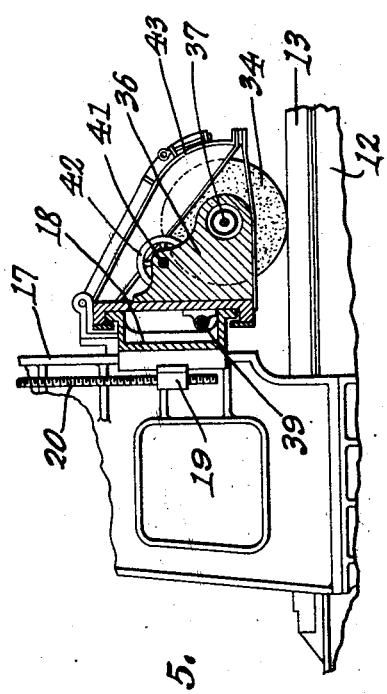

In the accompanying drawings Fig. 1 is a perspective view of the improved machine with the guard which is mounted over the cutting wheels lifted. Fig. 2 is a front elevation of the improved machine with the guard partly broken away. Fig. 3 is a side view of the machine. Fig. 4 is a detail broken out section of the shaft or arbor and its mountings, and Fig. 5 is a detail section on line 5—5, Fig. 2.

Referring to the drawings, 12 denotes the base of the machine, and 13 a platen or table on which the work is placed, and which is arranged to travel back and forth on suitable ways 14 on the base 12, the feeding or travelling movements of the work-supporting table or platen being imparted thereto through a train of reversing gearing 15 driven from a motor 16, this feeding mechanism for the said platen or table forming, however, no part of the present invention.

Mounted on uprights 17 forming part of the framework of the machine is a cross rail 18 having internally threaded ears 19 engaged by screw shafts 20 provided at their upper ends with bevel gears 21 engaged by bevel gears 22 on a shaft 23 carrying a sprocket wheel 24 connected by a sprocket chain 25 with a sprocket wheel 26 on a shaft driven by a motor 27, so that said cross rail may be raised and lowered by the operation of said motor.

Supported on the cross rail 18 is a head stock frame or block 28 which supports an electric motor 29 the shaft of which is preferably connected by the well known Grundy flexible coupling 30 with a spindle 31 having ball-bearing mountings in a block 32 fixed to the head stock frame or block 28 and having a tapered inner end portion $31^a$ entering an outwardly flaring recess in the shaft or arbor 33 on which the cutting wheels 34 are mounted. Keyed to the spindle 31 is a grab-clutch member $31^b$ engaging a second grab-clutch member $31^c$ keyed to the shaft or arbor 33, thus affording a positive driving connection between said spindle and said shaft or arbor.

The cutting wheels 34, which are preferably of carborundum, are spaced apart on the shaft or arbor 33 by sleeves or collars 35 between which said cutting wheels may be clamped in any suitable manner, as by a nut 38. Adjustably mounted on the cross rail 18 is a tail stock block 36 in which is rotatably mounted, preferably by ball bearings, a spindle 37 having a tapered inner end $37^a$ fitting an outwardly flaring recess in the end of the shaft or arbor 33 on which latter is mounted the nut 38 which may be screwed up or turned to clamp the sleeves or collars 35 against the cutting wheels 34, a lock nut $38^a$ being provided to hold the nut 38 in place when screwed up.

The head-stock and tail-stock blocks 28 and 36 are connected by means of a screw shaft 39 passing through a threaded hole or nut in the tail-stock block and provided with a handle 40 by which it may be turned. Also the said head-stock and tail-stock blocks are connected together by the threaded rod 41 passing loosely through openings in portions of the said blocks and provided with nut hand wheels 42 mounted on said threaded rod 41, and which, when said nut hand wheels are screwed up against the portions of said blocks through which said rod passes, will connect said blocks together so that by turning the screw shaft 39 the said blocks and the spindle or arbor 33 mounted thereon, and carrying the cutting wheels 34, may all be adjusted together transversely of the machine, as may be desired.

The tapered inner end parts 31ᵃ and 37ᵃ of the spindles 31 and 37 are at a slightly different angle from the outwardly flaring or inwardly tapering recesses in the ends of the shaft or arbor 33, as shown in Fig. 4, so that when said shaft or arbor is to be removed it will not stick or bind on the ends of said spindles.

In practice, several interchangeable shafts or arbors 33, with differently spaced cutting wheels 34, are provided, and when it is necessary to remove a shaft or arbor for replacement the tail-stock block 36 may be freed by unscrewing the wheel nuts 42 from said block, and then by turning the screw shaft 39 by its crank 40 the said tailstock block may be run back so as to disengage the tapered portion 37ᵃ of the spindle 37 from the said arbor or shaft 33, leaving the latter loose so that it may be readily removed. This ready dismounting of the arbor or shaft 33 is due to the fact that said arbor or shaft is of considerable less length than the distance between the head-stock and tail-stock blocks when the latter are in normal or working positions, so that only a comparatively short lateral adjustment of the said tail-stock block is necessary to disengage the spindle 37 from said arbor or shaft, and the latter will then be freed for removal. In previous machines it has taken considerable time to change the cutting wheels, and the machines have consequently been closed down during such time, thus delaying the operation of the machines; but in the present machine, by virtue of the construction hereinbefore described, the cutting wheel arbor or shaft may be quickly and readily removed and replaced by another, as will be understood.

From the foregoing it will be noted that the shaft or arbor carrying the cutting wheels is driven directly through the spindle 31 and flexible clutch or coupling 30 from the motor 29, without the intervention of any gearing, and by virtue of this feature the construction of the machine is very much simplified. The spindle 31 has a positive or live connection with the shaft or arbor 33 which carries the cutting wheels, for the purpose of rotating said shaft, as hereinbefore described and the spindle 37, through its tapered portion 37ᵃ, has when the tail-stock block is screwed up to working position, a frictional driven connection with said shaft or arbor so that it will rotate in its ball bearings in the tail stock block 36. Mounted on the tail-stock block 36 is a thrust bearing 36ᵃ for the spindle 37. It will thus be understood that the spindles 31 and 37, connected with the shaft or arbor 33, are both mounted to rotate in ball bearings as clearly shown in Fig. 4, so that the cutting operation of the machine may be effected at a minimum of expenditure of power.

Mounted on the cross rail 18, by a hinge connection, is a shield or guard 43 which may be lowered to working position, as shown in Fig. 3. This shield or guard is connected with a counterbalance weight 44 by means of a cord or other flexible connection 45 passing over pulleys 46 and 47, so that it may be readily lifted, as shown in Fig. 1, when access to the cutting wheels or the shaft by which they are carried is desired.

Water for moistening the cutting wheels is conducted to the machine through a water feed pipe 48 connected to a distributing pipe 49 from whence the water is conveyed through rubber hose or tubes 50 to the cutting wheels. The water thus supplied to the cutting wheels will be prevented from spattering about by virtue of the shield or guard 43, when the said shield or guard is in working position, as shown in Fig. 3.

In the operation of the improved machine hereinbefore described the work will be placed on the table or platen 13. The cross rail 20 and the cutting wheels and their operating mechanism will then be lowered to a proper position for the said cutting wheels to engage the work, by a proper operation of the motor 27 which drives the vertical shafts 20 by which the said cross rail is lowered or raised. In the cutting operation the cutting wheels may be lowered to a position to make a deep cut such as will sever the block of stone at a single feeding movement of the table or platen 13, with a comparativly slow feeding movement of said table or platen; or the block of work may be severed by successive cutting operations in feeding the table or platen back and forth, and in so doing the cutting wheels will be caused to make comparatively light cuts during the movements of the work in both directions.

From the foregoing it will be understood that the invention provides a convenient and easily operated multiplex carborundum wheel cutting machine, and in which the cutting wheels, properly spaced apart, may be readily mounted and dismounted, by taking out the shaft or arbor 33, which may be quickly replaced by another shaft or arbor with cutting wheels, spaced as may be desired, thereon. In the arrangment of the cutting wheels shown in Fig. 2 the outside cutting wheels are intended to trim off the edges of a block of stone, which, thus trimmed, will be severed into two parts by the central cutting wheel.

As hereinbefore stated, the shaft, 29ᵃ, of the electric motor 29 is preferably connected to the head-stock spindle by a Grundy flexible coupling 30, as this coupling enables the rotor of the motor to adjust itself to its own magnetic center, when running, and still permits power to be properly applied to the spindle 31 and cutting wheel arbor or shaft 33 even when said spindle and said arbor or shaft are somewhat out of alinement with the motor shaft 29ª. It will be understood, however, that other means than the flexible coupling 30 may be employed to connect a power shaft with said cutting wheel arbor or shaft, if desired.

The invention is not to be understood as being limited to the details of construction herein shown and described, as these details may be varied widely, within the province of mechanical skill, without departing from the scope of the invention as defined by the claims hereunto appended.

Having thus described my invention, I claim and desire to secure by Letters Patent:

1. In a stone cutting machine, the combination with head-stock and tail-stock blocks, of an arbor or shaft of lesser length than the distance between said blocks, a plurality of spaced-apart cutting wheels mounted on said arbor or shaft and rotating therewith, a rotary spindle mounted in each of said blocks, said spindles both having live connections with said arbor or shaft, and means for adjusting one of said blocks and its spindle in the direction of the axis of said arbor or shaft for convenient mounting and dismounting of said arbor or shaft.

2. In a stone-cutting machine, the combination with a head-stock and tail stock blocks, of an arbor or shaft of lesser length than the distance between said blocks and having inwardly tapering recesses at its ends, a plurality of spaced-apart cutting wheels mounted on said arbor or shaft and rotating therewith, a rotary spindle mounted in each of said blocks, said spindles both having live connections with said arbor or shaft, said live connections consisting of tapering ends on said shaft fitting said tapering recesses, and means for adjusting one of said blocks and its spindle in the direction of the axis of said harbor or shaft for convenient mounting and dismounting of said arbor or shaft.

3. In a stone cutting machine, the combination with an arbor or shaft, spacing sleeves loosely fitting said arbor or shaft and a plurality of cutting wheels rotating with said arbor or shaft and properly spaced apart by said sleeves, of headstock and tailstock blocks, spindles mounted in said blocks and having live connections with said arbor or shaft, a cross rail on which said blocks are supported, means for adjusting one of said blocks relative to the other on said cross rail, for convenient mounting or dismounting of said arbor or shaft, means for connecting said blocks together so that said blocks and the said arbor or shaft and cutting wheels may all be adjusted together, lengthwise of said cross rail, by said adjusting means.

4. In a stone cutting machine, the combination with an arbor or shaft, spacing sleeves loosely fitting said arbor or shaft and a plurality of cutting wheels rotating with said arbor or shaft and properly spaced apart by said sleeves, of headstock and tailstock blocks, spindles mounted in said blocks and having live connections with said arbor or shaft, a cross rail on which said blocks are supported, a screw shaft having a threaded connection with one of said blocks for adjusting such block relative to the other on said cross rail, for convenient mounting or dismounting of said arbor or shaft, means for connecting said blocks together so that said blocks and the said arbor or shaft and cutting wheels may all be adjusted together, lengthwise of said cross rail, by said adjusting means.

5. In a stone cutting machine, the combination with an arbor or shaft, a plurality of sleeves mounted on said arbor or shaft and cutting wheels rotating with said arbor or shaft and properly spaced apart by said sleeves, of headstock and tailstock blocks, a spindle mounted for rotation in each of said blocks, said spindles both having live connections with said arbor or shaft, a cross rail on which said blocks were supported, means for adjusting one of said blocks relative to the other on said cross rail, for convenient mounting or dismounting of said arbor or shaft, means for connecting said blocks together so that said blocks and the said arbor or shaft and cutting wheels may all be adjusted together, lengthwise of said cross rail, by said adjusting means, a motor having a shaft which is in alinement with said cutting wheel arbor or shaft, and a flexible coupling between said motor shaft and said cutting wheel arbor or shaft.

In testimony whereof I affix my signature.

EDSON T. POLLARD.